United States Patent [19]

Shiue et al.

[11] Patent Number: 5,712,873
[45] Date of Patent: Jan. 27, 1998

[54] MULTI-MODE EQUALIZER IN A DIGITAL VIDEO SIGNAL PROCESSING SYSTEM

[75] Inventors: Dong-Chang Shiue, Carmel; Kumar Ramaswamy; Paul Gothard Knutson, both of Indianapolis, all of Ind.

[73] Assignee: Thomson Consumer Electronics, Inc., Indianapolis, Ind.

[21] Appl. No.: 655,269

[22] Filed: Jun. 4, 1996

[51] Int. Cl.$^6$ .................. H03H 7/30; H03H 7/40
[52] U.S. Cl. .................. 375/233; 375/230; 375/231; 375/232
[58] Field of Search .................. 375/229, 231, 375/232, 233

[56] References Cited

U.S. PATENT DOCUMENTS

| | | | |
|---|---|---|---|
| 4,227,152 | 10/1980 | Godard et al. | 375/13 |
| 4,309,770 | 1/1982 | Godard | 375/14 |
| 5,414,732 | 5/1995 | Kaufmann | 375/232 |
| 5,506,871 | 4/1996 | Hwang et al. | 375/230 |
| 5,517,213 | 5/1996 | Bhatt et al. | 375/232 |
| 5,530,485 | 6/1996 | Kim et al. | 348/611 |
| 5,537,437 | 7/1996 | Kaku et al. | 375/231 |
| 5,539,773 | 7/1996 | Kuee et al. | 375/232 |
| 5,539,774 | 7/1996 | Nubakht et al. | 375/232 |
| 5,572,547 | 11/1996 | Citta et al. | 375/232 |
| 5,598,433 | 1/1997 | Kaku et al. | 375/230 |
| 5,602,872 | 2/1997 | Andrews | 375/234 |

FOREIGN PATENT DOCUMENTS

PCT/US95/03133 3/1995 WIPO.

OTHER PUBLICATIONS

Tianmin Liu et al., *Simulation and Implementation of US QAM–Based HDTV Channel Decoder*, IEEE Transaction on Consumer Electronics, vol. 39, No. 3, Aug. 1993.

Neil K. Jablon, *Joint Blind Equalization, Carrier Recovery, and Timing Recovery for High–Order QAM Signal Constellations*, IEEE Transaction on Signal Processing, vol. 40, No. 6, Jun. 1992.

R. Citta et al., *The Digital Spectrum–Compatible HDTV Transmission System*, IEEE Transactions on Consumer Electronics, Aug. 1991.

F. N. Godard, *Self–Recovering Equalization and Carrier Tracking in Two–Dimensional Data Communication Systems*, IEEE Transactions on Communications, vol. COM–28, No. 11, Nov. 1980.

E. A. Lee et al., *Digital Communication*, pp. 184–187 and pp. 335–339.

*Primary Examiner*—Stephen Chin
*Assistant Examiner*—Mohammad Ghayour
*Attorney, Agent, or Firm*—Joseph S. Tripoli; Eric P. Herrmann; Ronald H. Kurdyla

[57] ABSTRACT

A digital high definition television receiver equalizer system includes an input adaptive feed forward filter (FFF 20), a carrier recovery network (46), and a slicer (40) in addition to an adaptive decision feedback filter (DFF, 30) for removing intersymbol interference. At the beginning of a blind equalizing interval the FFF is not adapted and the DFF operates as a linear filter with adapted coefficients for equalizing post-ghosts. Afterwards in the blind interval the FFF coefficients are adapted blindly for equalizing pre-ghosts. In a subsequent decision-directed mode the slicer output is used for adapting both the FFF and DFF non-linearly.

8 Claims, 1 Drawing Sheet

MULTI-MODE EQUALIZER IN A DIGITAL VIDEO SIGNAL PROCESSING SYSTEM

FIELD OF THE INVENTION

This invention concerns a digital signal processing system. In particular, this invention concerns adaptive equalization of a video signal which may contain high definition television information, for example.

BACKGROUND OF THE INVENTION

The recovery of data from modulated signals conveying digital information in symbol form usually requires three functions at a receiver: timing recovery for symbol synchronization, carrier recovery (frequency demodulation to baseband), and equalization. Timing recovery is a process by which a receiver clock (timebase) is synchronized to a transmitter clock. This permits the received signal to be sampled at the optimum point in time to reduce the chance of a slicing error associated with decision-directed processing of received symbol values. Carrier recovery is a process by which a received RF signal, after being frequency down converted to a lower intermediate frequency passband (e.g., near baseband), is frequency shifted to baseband to permit recovery of the modulating baseband information.

Many digital data communications systems employ adaptive equalization to compensate for the effects of changing channel conditions and disturbances on the signal transmission channel. Equalization removes baseband intersymbol interference (ISI) caused by transmission channel disturbances including the low pass filtering effect of the transmission channel. ISI causes the value of a given symbol to be distorted by the values of preceding and following symbols, and essentially represents symbol "ghosts" since ISI includes advanced and delayed symbols with respect to a reference symbol location in a given decision region.

An adaptive equalizer is essentially an adaptive digital filter. In systems using an adaptive equalizer, it is necessary to provide a method of adapting the filter response so as to adequately compensate for channel distortions. Several algorithms are available for adapting the filter coefficients and thereby the filter response. One widely used method employs the Least Mean Squares (LMS) algorithm. In this algorithm, by varying coefficient values as a function of a representative error signal, the equalizer output signal is forced to approximately equal a reference data sequence. This error signal is formed by subtracting the equalizer output signal from the reference data sequence. As the error signal approaches zero, the equalizer approaches convergence whereby the equalizer output signal and the reference data sequence are approximately equal.

When the equalizer operation is initiated, the coefficient values (filter tap weights) are usually not set at values which produce adequate compensation of channel distortions. In order to force initial convergence of the equalizer coefficients, a known "training" signal may be used as the reference signal. This signal is programmed at both the transmitter and receiver. The error signal is formed at the receiver by subtracting a locally generated copy of the training signal from the output of the adaptive equalizer. The training signal helps to open the initially occluded "eye" of the received signal, as known. After adaption with the training signal, the "eye" has opened considerably and the equalizer is switched to a decision-directed operating mode. In this mode final convergence of the filter tap weights is achieved by using the actual values of symbols from the output of the equalizer instead of using the training signal. The decision directed equalizing mode is capable of tracking and cancelling time varying channel distortions more rapidly than methods using periodically transmitted training signals. In order for decision directed equalization to provide reliable convergence and stable coefficient values, approximately 90% of the decisions must be correct. The training signal helps the equalizer achieve this 90% correct decision level.

In practice, however, a training signal is not always available. In such case "blind' equalization is often used to provide initial convergence of the equalizer coefficient values and to force the eye to open. Blind equalization has been extensively studied and used for QAM systems, for example. Among the most popular blind equalization algorithms are the Constant Modulus Algorithm (CMA) and the Reduced Constellation Algorithm (RCA). These algorithms are discussed, for example, in Proakis, *Digital Communications*, McGraw-Hill: New York, 1989 and in Godard, Self-Recovering Equalization and Carrier Tracking in Two Dimensional Data Communication Systems," IEEE *Transactions on Communications*, November 1980. Briefly, the CMA relies on the fact that, at the decision instants, the modulus of the detected data symbols should lie on a locus of points defining one of several (constellation) circles of different diameters. The RCA relies on forming "super constellations" within the main transmitted constellation. The data signal is first forced to fit into a super constellation, then the super constellation is subdivided to include the entire constellation.

In a conventional system using a feed forward filter (FFF) and a decision feedback filter (DFF) as equalizers, the FFF typically performs adaptive blind equalization (not decision-directed) during the initial signal acquisition interval. The DFF does not provide equalization at this time. At the end of the blind equalization interval, the DFF is activated for decision-directed equalization. At this time both the FFF and the DFF have their coefficients adapted (updated) in response to locally generated control signals in a decision-directed mode, e.g., based on differences between symbol samples appearing at the input and the output of a slicer network. This approach has disadvantages. If significant ISI and ghost effects are present, it will be difficult for the FFF to achieve equalization since the filter center tap will be contaminated by symbol "ghosts." To equalize pre- and post-ghosts, the FFF employs both pre-cursor and post-cursor taps. The post-cursor taps of the FFF overlap with the post-cursor taps of the DFF, which is not an efficient use of filter taps. This limitation is avoided by a system according to the present invention.

SUMMARY OF THE INVENTION

In accordance with the principles of the present invention, a digital signal processor includes a decision feedback filter (DFF) which exhibits different operating modes before and during decision-directed equalization. Specifically, the DFF operates as a linear feedback filter during blind equalization, and as a non-linear filter in the decision-directed mode after blind equalization.

An illustrated preferred embodiment includes a feed-forward filter (FFF), a decision feedback filter (DFF), and a symbol slicer. During an initial phase of blind equalization the slicer output signal is decoupled from the DFF and replaced with the slicer input signal, the FFF is static whereby its coefficients are not adapted, and the DFF operates in a non-decision directed mode as a linear feedback filter using a blind adaption algorithm to adapt its coefficients. Later in the blind equalizing interval, the FFF coefficients are updated using a blind algorithm and the DFF operates as before. Afterwards, in a decision-directed mode, the slicer output signal is applied to circuits including the DFF, the FFF coefficients are adapted in response to a control signal, and the DFF operates as a decision directed non-linear filter with its coefficients adapted in response to a control signal. The disclosed system advantageously provides better utilization of equalizer filter taps and enhances the ability of a decision-directed DFF equalizing system to achieve fast convergence in the presence of large ghost signals.

In accordance with a feature of the invention, the FFF compensates for pre-ghost signals rather than both pre- and post-ghost signals, and the DFF compensates for post-ghost signals substantially exclusive of pre-ghost signals.

BRIEF DESCRIPTION OF THE DRAWING

The Figure is a block diagram of a portion of an advanced television receiver, such as a high definition television (HDTV) receiver, including an equalizer system according to the principles of the present invention.

DETAILED DESCRIPTION OF THE DRAWING

Figure 1:
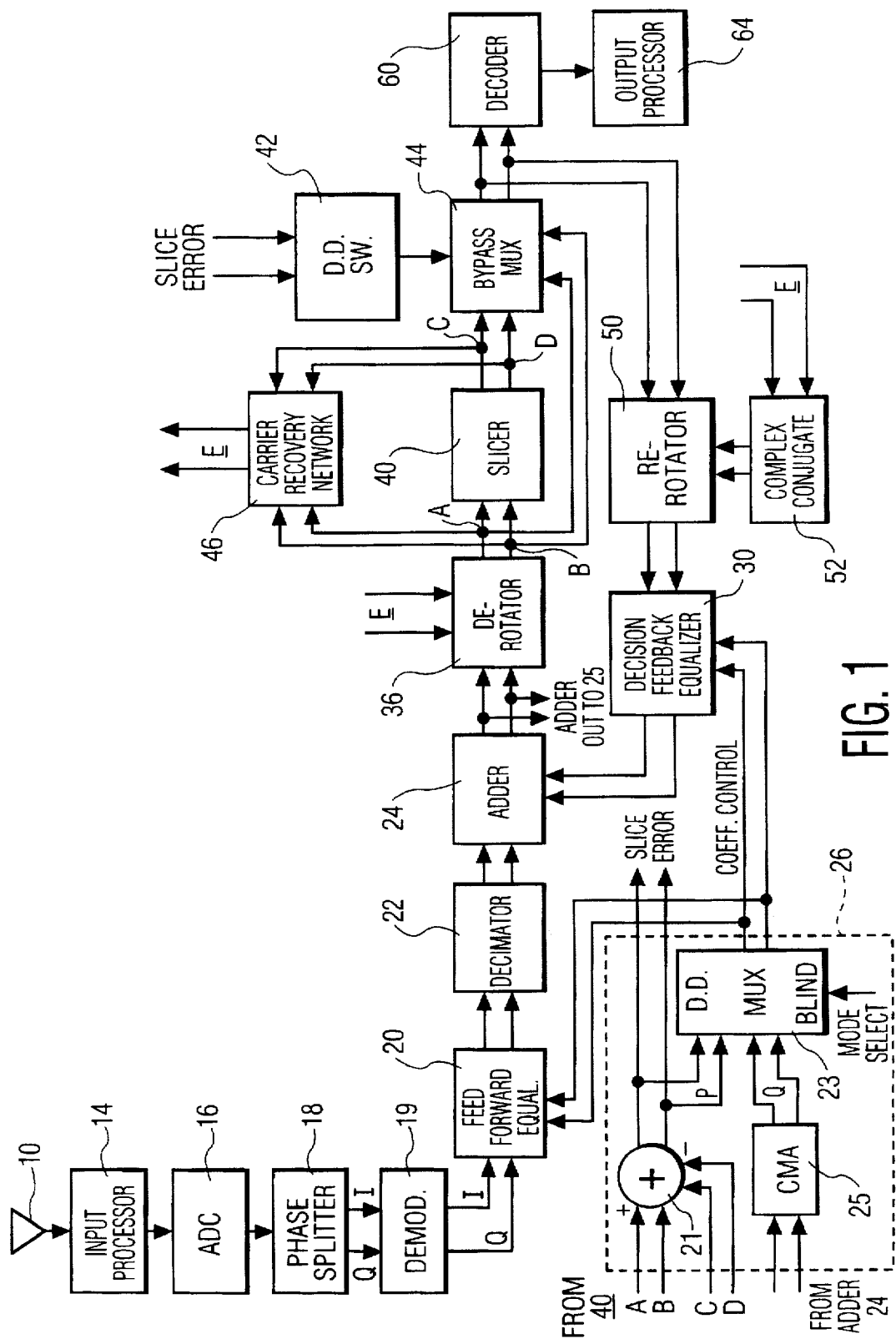

In the Figure, a modulated analog HDTV signal received by an antenna 10 is processed by an input network 14 including RF tuning circuits, a double conversion tuner for producing an intermediate frequency passband output signal, and appropriate gain control circuits, for example. The received signal may exhibit quadrature amplitude modulation (e.g., 16- or 32-QAM as known), or other forms of PAM modulation such as QPSK and VSB. QAM is a form of pulse amplitude modulated (PAM) signal in which digital information is represented by a two-dimensional grid-like symbol constellation defined by quadrature Real and Imaginary axes. A VSB signal, e.g., as proposed for use by the Grand Alliance HDTV system in the United States, is represented by a one-dimensional data symbol constellation wherein only one axis contains quantized data to be recovered by the receiver. To simplify the Figure, not shown are signals for clocking the illustrated functional blocks or a timing recovery network (as known) for deriving timing and clock signals from the received signal.

The passband output signal from input processor 14 is converted from analog to digital form by analog-to-digital converter 16, and applied to a phase splitter 18 which separates the quadrature phase "I" and "Q" complex (real and imaginary) components of the signal from unit 16. The I, Q signals from unit 18 contain digital data as well as inter-symbol interference (ISI) caused by transmission channel disturbances and artifacts. This signal is applied to a complex feed-forward filter (FFF) 20 operating as an equalizer, e.g., a fractionally spaced equalizer, which in this case is implemented as a digital FIR filter. In some operating modes the coefficient values (tap weights) of equalizer filter 20 are adaptively controlled by a control signal from a control signal generator 26 as will be discussed. The equalized signal from unit 20 is decimated (downsampled) by unit 22. Decimator 22 reduces the symbol rate of the output signal from FFF 20 from two samples/symbol to one sample/symbol as is appropriate for subsequent networks in this system. The use of decimator 22 is optional and may not be required in all systems.

Unit 19 performs preliminary demodulation (as known) on the output signal from unit 18 before it is applied to equalizer 20. The preliminary demodulation brings the signal closer to baseband so that the subsequent circuits do not have to operate on the higher frequency intermediate frequency (IF) signal. The locally generated carrier frequency used for this purpose may not precisely match the transmitter carrier frequency, whereby phase errors result from this demodulation. These phase errors are corrected by a further demodulation process involving de-rotator 36 (a complex multiplier) and slicer 40 associated with a carrier recovery network 46. Network 46 produces a sinusoidal phase error representative signal E in response to the difference between the symbol input and corresponding symbol output of slicer 40. For each symbol, slicer 40 selects, from a programmed look-up table, the data symbol corresponding to the point in the symbol constellation that is closest to the input symbol sample as its decision. That is, the slicer selects as its decision the symbol in its alphabet which is closest in Euclidean distance to the input symbol sample. Error signal E is a function of this distance. This error signal is applied to a control input of de-rotator 36 for halting the rotation of the symbol constellation caused by the carrier frequency offset. Additional information concerning the preliminary demodulation, carrier recovery, slicing and derotating operations is found in the text by Lee and Messerschmitt *Digital Communication*, Kluwer Academic Publishers, Boston MA, U.S.A. The output signal from unit 22 is combined by adder 24 with an equalized output signal from decision feedback filter (DFF) 30 operating as an equalizer as will be discussed. DFF 30 removes intersymbol interference not removed by FFF 20. The output signal from adder 24 exhibits a rotating symbol constellation due to the carrier frequency offset as mentioned previously. The rotation is stopped and the signal is brought to baseband by applying sinusoidal error control signal E from the output of carrier recovery network 46 to one of the multiplier inputs of derotator 36.

Either the output signal or the input signal of slicer 40 is applied to an input of a re-rotator 50 (a complex multiplier) by means of a multiplexer (MUX) 44 in response to a control signal from a decision directed switch 42 as will be discussed. Another input of re-rotator 50 receives a conjugated version of complex error signal E from complex conjugation network 52. Network 52 develops the complex conjugate of error signal E by inverting the imaginary component of error signal E using known signal processing techniques. The complex conjugation causes multiplier 50 to rotate the signal applied to its input by the same amount as de-rotator 36, but in the opposite direction. Thus the re-rotation causes the symbol constellation to be rotated back to its condition prior to de-rotation by unit 36. This is necessary because the equalized output signal from DFF 30 is added to the equalized output signal from FFF 20 in adder 24, which requires that the equalized signals added by unit 24 are made time-coincident with respect to the rotational characteristics of the symbol constellation.

Both FFF 20 and DFF 30 have coefficient values adapted (updated) in response to a Coefficient Control signal from control signal generator 26 during the blind and decision-directed modes. Generator 26 also develops a Slice Error signal for controlling the operation of switch 42 as between the blind and decision-directed equalizing modes. The operation of unit 26 will be discussed in greater detail subsequently.

An equalized baseband signal is decoded by unit 60 and processed by output network 64. Decoder 60 may include, for example, de-interleaver, Reed-Solomon error correction and audio/video decoder networks as known. Output processor 64 may include audio/video processors and audio/video reproduction devices.

Both FFF 20 and DFF 30 are digital filters which individually perform equalizing functions. When considered together, these filters represent an aggregate equalizer for equalizing the input signal to decoder 60. FFF 20 and DFF 30 exhibit different operating modes over the blind and decision-directed equalization intervals. Specifically, DFF 30 operates as a linear feedback filter during blind equalization, and as a non-linear filter in a decision-directed mode following blind equalization. FFF 20 is static during an initial portion of a blind equalizing interval whereby its coefficients are not updated, but operates adaptively during the remainder of the blind equalizing interval and during the decision-directed interval. These functions are facilitated by switch 42 and multiplexer The equalization operation encompasses a blind equalization interval and a subsequent decision-directed interval. The blind interval comprises an initial phase and a final phase. The initial phase of blind equalization may begin when the system is initially energized or is reset, for example. At this time a Mode Select signal, generated by a local microcontroller in response to powerup or reset, exhibits a state indicating that blind equalization is to be performed. In response to this condition of the Mode Select signal, multiplexer (MUX) 23 switches MUX input signal Q to its output as the Coefficient Control signal for FFF 20 and DFF 30. Signal Q is provided by a network 25 which employs the CMA algorithm (as known) in response to the output signal produced by adder 24. It is noted, however, that although the coefficients of DFF 30 are adapted in response to the Coefficient Control signal during the initial portion of the blind equalization interval, the coefficients of FFF 20 are not adapted at this time. This static condition of FFF 20 is maintained until after a predetermined number of symbols have been sampled.

During the initial phase of blind equalization, DFF 30 operates as a linear filter in response to the Coefficient Control signal produced by the CMA blind adaption algorithm. The initial operation of DFF 30 as a linear filter produces some convergence which facilitates system equalization particularly in the presence of significant signal ghosts, as will be explained. After a predetermined number of symbols have been sampled, e.g., 10,000 symbols, FFF 20 is enabled for adaptive operation whereby its coefficients are updated in response to the Coefficient Control signal produced by using the CMA blind adaption algorithm. DFF 30 continues to perform blind equalization as a linear feedback filter using the blind adaption algorithm. FFF 20 can be enabled for adaptive equalization by employing a counter, accumulator and comparator in association with coefficient control circuits of FFF 20. These elements have not been shown to simplify the drawing. After the comparator senses that a predetermined number of symbols have been sampled (signifying the end of the initial phase of the blind equalization interval), the coefficient control circuit of FFF 20 is enabled by an appropriate switching network in response to a control signal from the comparator.

Throughout both the initial and final phases of the blind equalizing interval, a differential symbol processor 21 in control generator 26 evaluates the differences between the locations of corresponding input symbols and output symbols of slicer 40, and produces an output Slice Error control signal as a function of this difference. This process is well known. The Slice Error signal controls the switching operation of switch 42 between blind and decision-directed equalizing modes. Specifically, the system switches to the decision-directed mode when switch 42 senses that the number of symbol points in a predetermined decision region around a programmed (expected) symbol point has reached a predetermined value. An increasing number of symbol points in the decision region indicates increasing convergence.

For example, the number of data points falling inside the decision region for a given number of symbol samples is measured by an accumulator and counter in unit 42. If the measured number of samples within the decision regions exceeds a predetermined threshold as indicated by the value of the Slice Error signal (e.g., 500 out of 1000 samples), a comparator within switch 42 senses this value and provides an output control signal causing MUX 44 to switch from the blind to the decision-directed mode. In the decision-directed mode MUX 44 conveys the output signal of slicer 40 to decoder 60 and to DFF 30 via re-rotator 50. At the same time, the control signal developed by switch 42 may be used to change the state of the Mode Select control signal for MUX 23 (via the local microcontroller) so that in the decision-directed mode MUX 23 selects the Slice Error signal (input P) as the Coefficient Control signal for FFF 20 and DFF 30 in the decision-directed mode. Alternatively, a separate compartor could be used for this purpose.

Generator 26 provides the Slice Error signal as the Coefficient Control signal to FFF 20 and DFF 30 throughout the decision-directed interval for adapting the values of respectively associated coefficients. Thus in the decision-directed equalization mode FFF 20 operates adaplively and DFF 30 operates adaptively as a non-linear decision-directed feedback filter.

In this example FFF 20 has a limited equalizing range and equalizes only pre-ghost components, rather than both pre- and post-ghost components. This is known as anti-causal equalization. DFF 30 equalizes only post-ghost components, i.e., causal equalization. This arrangement of FFF 20 and DFF 30 represents an efficient use of filter taps as it avoids tap overlap (redundant taps) in the time domain, particularly with respect to post-ghosts.

The described system achieves faster, more effective equalization in the presence of large ghosts by not relying on the FFF to equalize ghosts at the beginning of the blind equalization interval. Instead, at the beginning of blind equalization DFF 30 is used as a linear IIR filter to equalize post-ghosts, before FFF 20 is adapted. This result is facilitated by the use of re-rotator 50 as discussed previously. At the beginning of the blind equalizing interval DFF 30 advantageously operates as a linear feedback filter and thus exhibits the ability of a feedback filter to cancel far-out ghost components. In addition, the disclosed system exhibits a smoother transition from a linear operating mode to a non-linear decision-directed mode after blind equalization, compared to a conventional system using FFF and DFF equalization. This is because DFF 30 begins operation in the non-linear mode after having been pre-conditioned by operating in the linear mode, i.e., many of its coefficients have been adapted in the direction of their final values.

It has been observed that, in a conventional system, if both the DFF and FFF operate adaptively at the beginning of the blind equalization interval, the FFF center tap tends to be contaminated by ghost components, whereby the FFF may be unable to equalize a bad channel. A symptom of tap contamination is that ghost energy is removed as DC gain which reduces equalizer output. In contrast, in the disclosed system in the blind equalizing mode the delayed ghost is removed by a post-cursor filter tap associated with DFF 30. The disclosed system avoids the limitations of the conventional approach by in effect "freezing" the FFF during the initial portion of the blind equalization interval, keeping gain constant in its one initial non-zero center tap, and utilizing the DFF linear feedback operation to attenuate post-ghost energy as much as possible during this initial interval. Thus the disclosed system advantageously partitions the FFF and DFF operations for effective pre- and post-ghost attenuation.

Other arrangements employing the principles of the present invention are also possible. For example, de-rotator 36 may be located before FFF 20 rather than after adder 24 as shown. However, such an arrangement puts the delay associated with FFF 20 in the carrier recovery network control loop, which may compromise the effectiveness of the carrier recovery network. In such case, however, re-rotator 50 may not be needed, resulting in a hardware savings.

The principles of the present invention also apply to a system responsive to a training signal. In such case the training signal is used to generate an error signal which is used to update DFF coefficients in the initial linear operating mode of the DFF prior to the non-linear decision directed mode.

In addition, the principles of the invention may be used in terrestrial broadcast systems such as multipoint microwave distribution systems (MMDS), and various QAM formats such as 16-, 32- and 256-QAM for example.

What is claimed is:

1. A system for processing a received signal containing a constellation of symbols and subject to exhibiting unwanted perturbations, comprising an adaptive feed forward filter (FFF) for equalizing said received signal;

an adaptive decision feedback filter (DFF) for equalizing said received signal; and a demodulator responsive to an equalized signal, wherein said FFF exhibits (1) non-adaptive operation during an initial phase of a non-decision directed equalizing interval, (2) non-decision directed adaptive operation during a later phase of said non-decision directed equalizing interval, and (3) decision-directed adaptive operation during a final equalizing interval following said non-decision directed equalizing interval; and said DFF exhibits (1) non-decision directed adaptive linear operation during said initial non-decision directed equalizing phase, (2) non-decision directed adaptive linear operation during said later phase of non-decision directed equalizing interval, and (3) non-linear decision-directed adaptive operation during said final equalizing interval.

2. A system according to claim 1 wherein said demodulator is responsive to an output signal from at least one of said FFF and DFF, said demodulator including a control network for providing a control signal representing a carrier frequency offset of a received signal, and a first rotator for rotating a received symbol constellation in a first direction in response to said control signal to achieve demodulation;

a second rotator responsive an output signal of said demodulator for rotating said demodulator output signal in a direction opposite to that of said first rotator to produce a re-rotated symbol constellation signal; and means for applying said re-rotated signal to said DFF to be equalized thereby.

3. A system according to claim 2, wherein said demodulator includes a symbol slicer, said slicer having an input and an output, said output being decoupled during said non-decision directed equalizing interval.

4. A system according to claim 1, wherein said non-decision directed interval is a blind equalizing interval.

5. In a system for processing a received signal subject to exhibiting unwanted perturbations, said system including a feedforward filter (FFF) and a decision-feedback filter (DFF), a method for equalizing said signal comprising the steps of:

(a) during an initial phase of a non-decision directed equalizing interval
  (1) operating said FFF in a static condition wherein coefficients of said FFF are not updated;
  (2) adapting said DFF in a non-decision directed manner;

(b) during a subsequent phase of said non-decision directed equalizing interval
  (1) adapting said FFF in a non-decision directed manner;
  (2) adapting said DFF in a non-decision directed manner; and (c) during an equalizing interval following said non-decision directed equalizing interval
  (1) adapting said FFF in a decision-directed mode;
  (2) adapting said DFF in a decision-directed mode.

6. A method according to claim 5, wherein said DFF operates as a linear filter in said non-decision directed equalizing interval; and said DFF operates as a non-linear filter in said following interval.

7. A method according to claim 5 including the further steps of (d) generating a control signal representing a carrier frequency offset of said received signal; and (e) applying said control signal to said FFF and DFF in said decision-directed mode.

8. A method according to claim 5, wherein said non-decision directed interval is a blind equalizing interval.

* * * * *